US012765970B2

(12) United States Patent
Madan

(10) Patent No.: US 12,765,970 B2
(45) Date of Patent: Oct. 20, 2026

(54) PALATAL EXPANDER AND METHOD OF USE

(71) Applicant: Rohit Madan, Saar (BH)

(72) Inventor: Rohit Madan, Saar (BH)

(*) Notice: Subject to any disclaimer, the term of this patent is extended or adjusted under 35 U.S.C. 154(b) by 0 days.

(21) Appl. No.: 18/952,414

(22) Filed: Nov. 19, 2024

(65) Prior Publication Data

US 2026/0137488 A1 May 21, 2026

(51) Int. Cl.
*A61C 7/10* (2006.01)

(52) U.S. Cl.
CPC .................................... *A61C 7/10* (2013.01)

(58) Field of Classification Search
CPC ....... A61C 7/10; A61B 17/025; A61B 17/176; A61B 17/663; A61B 17/666; A61B 17/885; A61B 17/8004; A61B 17/8071; A61F 2002/30525
See application file for complete search history.

(56) References Cited

U.S. PATENT DOCUMENTS

| | | | | |
|---|---|---|---|---|
| 3,977,082 A * | 8/1976 | Siatkowski | A61C 7/10 433/7 | |
| 5,439,377 A * | 8/1995 | Milanovich | A61C 7/10 433/7 | |
| 5,904,479 A * | 5/1999 | Staples | A61C 7/10 433/7 | |
| 6,616,672 B1 * | 9/2003 | Essiger | A61B 17/666 433/7 | |
| 10,743,965 B2 * | 8/2020 | Moon | A61C 7/02 | |
| 2008/0114367 A1 * | 5/2008 | Meyer | A61F 2/442 606/191 | |
| 2018/0368945 A1 * | 12/2018 | Moon | A61C 7/02 | |
| 2021/0244504 A1 * | 8/2021 | Kelleher | A61C 7/08 | |

FOREIGN PATENT DOCUMENTS

| | | | | |
|---|---|---|---|---|
| CN | 107661149 A * | 2/2018 | A61C 7/00 | |
| KR | 101949445 B1 * | 4/2019 | A61B 17/8014 | |
| WO | WO-2010018266 A1 * | 2/2010 | A61C 7/10 | |

* cited by examiner

*Primary Examiner* — Edelmira Bosques
*Assistant Examiner* — Matthew P Saunders
(74) *Attorney, Agent, or Firm* — Alexander Postnikov

(57) ABSTRACT

A device for laterally expanding a patient's palate, featuring a longitudinally extending screw with at least one threaded end. A first gear is mounted on the screw, coupled to a second gear that receives torque from a tool. Rotation of the second gear causes the screw to turn, moving front and back nuts in opposite longitudinal directions. These nuts are pivotally connected to left and right linkages, which move laterally when the nuts approach each other. Pads attached to the linkages are configured to secure anchoring mechanisms that apply lateral force on a patient's teeth during expansion. The device can be enclosed in a housing that guides the movement of internal components, with the pads protruding from the sides during expansion. The design ensures effective, controlled, and symmetrical palatal expansion, with potential customization for patient comfort and fit.

7 Claims, 10 Drawing Sheets

PALATAL EXPANDER AND METHOD OF USE

BACKGROUND

Field of the Invention

The invention relates generally to orthodontics, and, more particularly, to a device and method for expanding the palate of a patient.

Scope of the Prior Art

Modern palatal expanders are orthodontic devices used to widen the upper jaw, typically in children, to correct issues such as crossbites, dental crowding, and insufficient arch space. These devices work by applying gradual pressure to the palatal bones, encouraging them to move apart and create more space within the mouth. The most common design features a central screw mechanism that, when turned, slowly expands the device and, in turn, the palate.

This process typically requires a key to be inserted into a small hole in the expander and then rotated towards the back of the patient's mouth to turn the central screw. This maneuver can be challenging for patients and caregivers alike, as it requires precision and a steady hand. Accessing the back of the mouth is inherently difficult, which can lead to errors such as incomplete turns or over-rotation, both of which can affect the treatment's effectiveness and cause discomfort. Additionally, the need to repeatedly rotate the key towards the back of the mouth can be uncomfortable and anxiety-inducing for young patients, sometimes causing pain or pressure as the palate is expanded.

Existing expanders also come with additional limitations. One of the most significant risks is the risk of injury during the expansion process, as the key can easily slip and hurt the patient, especially when trying to turn the screw in such a confined area. Another issue is unintentional screw reversal, particularly during the last turn when the awkward angle makes it more likely that the screw will be accidentally reversed while removing the key. Additionally, self-reversal of screws is a common problem, where the expander screw "unturns" due to pressure from the patient's cheeks or muscles, requiring a blockage with composite resin to prevent relapse.

Moreover, limited expansion with smaller expanders is another concern, especially for patients with very narrow upper jaws. Smaller-width expanders often don't achieve full expansion and might necessitate the use of a second device, adding to the clinical hassle and prolonging treatment. Larger expanders, on the other hand, may not fit properly in narrow spaces.

What is needed is a palatal expander with novel gear configurations which addresses these issues. One preferred gear arrangement uses a worm coupled to another worm gear to permit rotation of the key along a vertical axis. Another preferred gear arrangement uses two bevel gears, where one of the bevel gears receives a hex key in a manner that permits continuous rotation during the expansion process. In this innovative design, the key's rotational motion is translated into the gradual expansion of the device. This setup offers several advantages: it simplifies the process by allowing the key to be turned in a more accessible, continuous manner, reducing the need for awkward maneuvers towards the back of the mouth.

This continuous rotation mechanism not only improves precision, ensuring that each turn contributes to the correct amount of expansion, but it also enhances patient comfort by making the process smoother and less stressful. The gearbox mechanism thus represents a significant improvement in ease of use, accuracy, and patient experience over traditional palatal expanders, while addressing the problems of injury risk, unintentional screw reversal, limited expansion, and self-reversal of screws.

SUMMARY

One aspect of the present invention is directed at a device designed to laterally expand a patient's palate. The device may comprise a longitudinally extending screw with oppositely threaded front and back ends. A first gear mounted on this screw can be coupled to a second gear configured to receive a torque-producing tool. Rotating the second gear with the torque-producing tool rotates the screw. Front and back nuts, which are threadably received on the respective ends of the screw, are caused to move in opposite longitudinal directions when the screw is rotated.

The device includes left and right hand linkages that are pivotally connected to the front and back nuts, respectively. As the nuts move towards each other, the apexes of the linkages move in opposite lateral directions. Pads coupled to the apexes of the linkages are designed to secure anchoring components, facilitating the lateral expansion of the palate.

Various gear configurations can be used to rotate the screw. In some embodiments, the first gear is a worm gear with an axis of rotation that forms a 90-degree angle with the second gear. In other embodiments, both gears are bevel gears, with the angle between their axes of rotation varying between 5 degrees and 85 degrees.

The device may include a housing that encases the screw, nuts, linkages, and pads in a compact configuration. When the front and back nuts are caused to move towards each other, the pads protrude from the sides of the housing, applying a lateral force to the patient's teeth via anchoring components. This design ensures that the device remains compact and easy to use while providing effective and controlled expansion of the palate.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while embodiments described herein are primarily discussed in the context of devices and methods to expand a palate, it will be recognized by those of ordinary skill that the present disclosure is not so limited. In fact, the principles of the present disclosure described herein may be readily applied to other orthodontic procedures.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 1A:
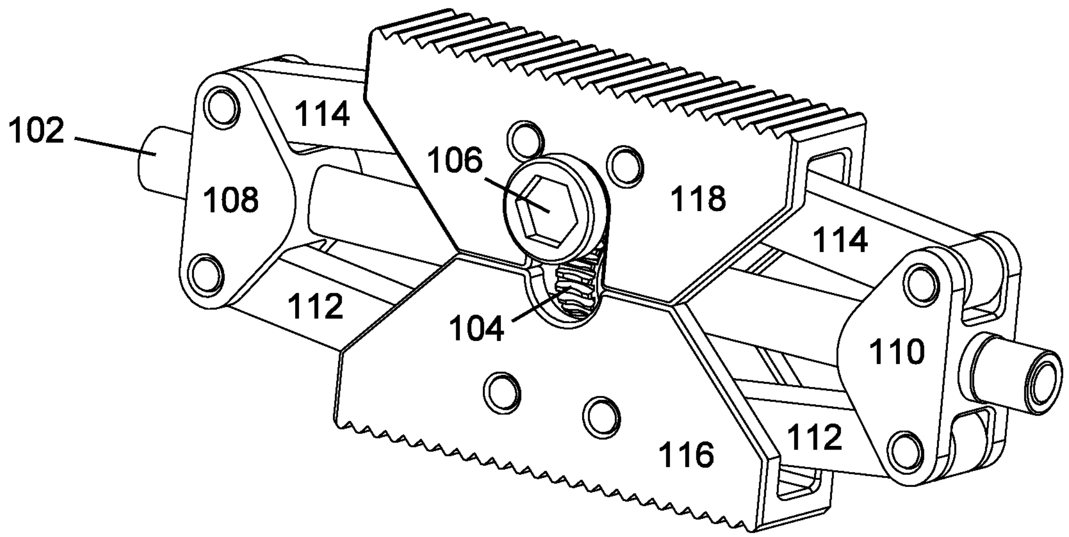
FIGS. 1*a*-1*b* show a palate expanding device having a central gear arrangement, according to an embodiment.
Figure 1B:
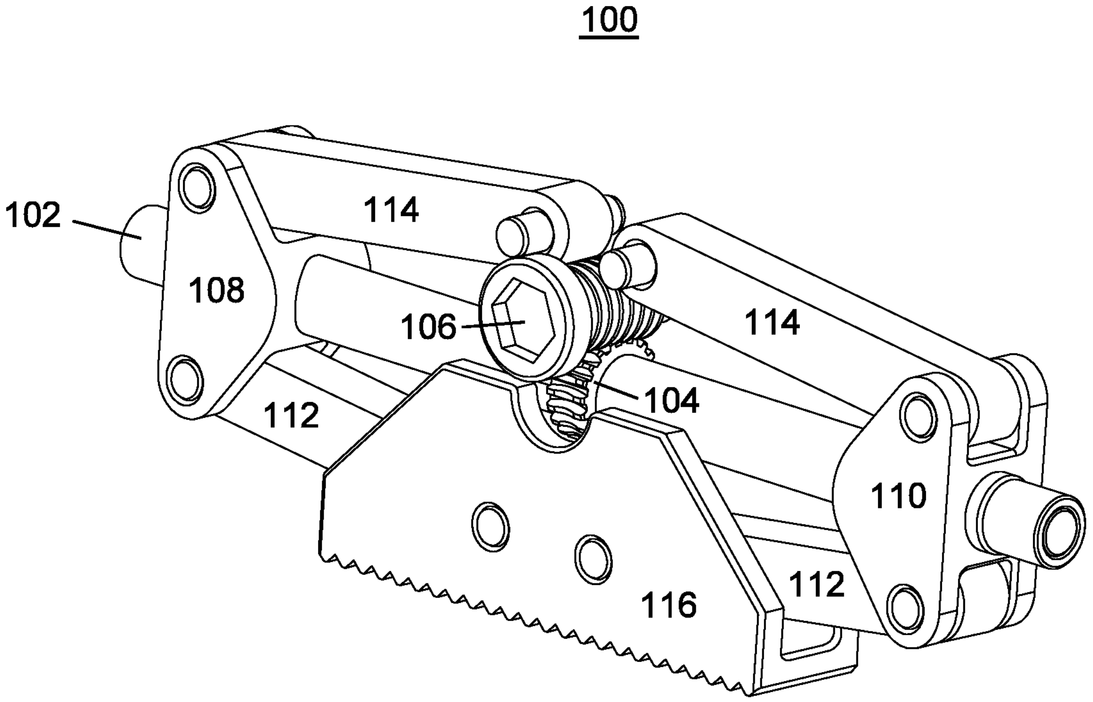

FIGS. 1*a*-1*b* show a device 100 to expand a palate. The device 100 may comprise a screw 102, a first gear 104, a second gear 106, a front nut 108, a back nut 110, a left linkage 112, a right linkage 114, a left pad 116, and a right pad 118.

The screw 102 is a longitudinally extending component. The screw 102 has a front end configured to be positioned behind the upper front teeth of a patient and a back end extending towards the back of the mouth. In an embodiment, the screw 102 has two oppositely threaded ends, meaning the threading on the front end is oriented in the opposite direction of the threading on the back end. This opposing threading allows the screw 102 to induce synchronized movement in opposite directions when rotated. Alternatively, the screw 102 is only threaded on one end.

The first gear 104 is responsible for translating rotational input from a torque-producing tool into the controlled movement of the screw 102, which ultimately drives the expansion mechanism. This gear is designed with flexibility in mind, as it can be mounted in one of two distinct positions on the screw 102, depending on the specific configuration of the device 100:

Here, the first gear 104 is centrally mounted between the oppositely threaded front and back ends of the screw 102. This central placement allows the first gear 104 to directly interface with a centrally placed second gear 106. The mid-screw mounting is advantageous when the design requires a balanced distribution of forces across the length of the screw 102.

Alternatively, the first gear 104 can be mounted at the front end of the screw 102, near the area intended to be positioned behind the patient's upper front teeth. This frontal placement allows the first gear 104 to directly interface with a frontally placed second gear 106. This mounting option is beneficial in designs that prioritize compactness or specific directional control at the front end of the device 100.

Here, the first gear 104 is a worm gear. This type of gear is characterized by its helical thread that meshes with a toothed wheel (the second gear 106). A worm gear is particularly effective in scenarios where a high torque reduction is needed, and it allows the device 100 to operate with precise control over the screw's rotation. In this configuration, the axis of rotation of the first gear 104 is horizontal and the axis of rotation of the second gear 106 is vertical, such that the angle in between axes of rotation of the first and second gears is 90 degrees.

Alternatively, the first gear 104 is a bevel gear. Bevel gears have teeth that are angled, allowing them to mesh with another gear at an angle other than 90 degrees. The angle between the axes of rotation for the first and second gears can vary within a specified range, providing flexibility in the design. In order of increasing preference, the angle is between the axes of rotation of the first and second gears is 5-85 degrees, 10-80 degrees, 15-75 degrees, 20-70 degrees, 25-65 degrees, 30-60 degrees, 35-55 degrees, and 40-50 degrees. Alternatively, the angle in between the axis of rotation of the first and second gears is 5-50 degrees, 10-50 degrees, 15-50 degrees, 20-50 degrees, and 25-50 degrees. Yet alternatively, the angle in between the axis of rotation of the first and second gears is 10-45 degrees, 15-40 degrees, and 20-35 degrees.

The second gear 106 is an essential component that works in tandem with the first gear 104 to facilitate the controlled rotation of the screw 102.

Here, the second gear 106 is mounted adjacent to the first gear 104, which is centrally positioned on the screw 102. This arrangement allows for efficient transfer of torque from the second gear 106 to the first gear 104, which then drives the screw 102.

Alternatively, the second gear 106 is positioned near the front end of the screw 102, where the first gear 104 is also mounted. This setup is particularly useful in compact designs where the gear mechanism is concentrated at the front of the device 100, near the patient's upper front teeth.

Here, the second gear 106 is a worm that meshes with a worm gear as the first gear 104. This pairing is advantageous when precise control and significant torque reduction are required, making it ideal for fine adjustments during the palate expansion process.

Alternatively, the second gear 106 is a bevel gear that meshes with another bevel gear as the first gear 104. The bevel gear pairing allows the angle between the axes of rotation of the first and second gears to be set at various angles. Setting a shallow angle between the axes of rotation allows the second gear 106 to receive a torque-producing tool, such as a hex key, in a manner that allows the torque-producing tool to be rotated continuously while the device 100 is being expanded. This functionality vastly simplifies the palate expansion process.

The front and back nuts are configured to translate the rotational motion of the screw 102 into a longitudinal motion of the front and back nuts.

Here, the front nut 108 is threadably received on the front end of the screw 102 and the back nut 110 is threadably received on the back end of the screw 102. The front and back nuts move longitudinally along the screw 102 as it rotates. Given the oppositely threaded nature of the screw's front and back ends, the front nut 108 will move in the opposite direction of the back nut 110 when the screw 102 is rotated in one direction and the front nut 108 will move towards the back nut 110 when the screw 102 is rotated in the other direction.

Alternatively, the front nut 108 is configured to rotatably hold the front end of the screw 102. The front end of the screw 102 is seated within the front nut 108 in such a way that the screw 102 can rotate freely within the nut. However, the front nut 108 does not move longitudinally along the screw 102 as it rotates.

The left and right linkages are configured to translate the linear motion of the front and back nuts into the lateral movement of the pads.

Here, one end of the left linkage 112 is pivotally connected to the front nut 108 and the other end of the left linkage 112 is pivotally connected to the back nut 110. Likewise, one end of the right linkage 114 is pivotally connected to the front nut 108 and the other end of the right linkage 114 is pivotally connected to the back nut 110. Each linkage has an apex near its center point. Here, the apex of each linkage is the point where it connects to a pad. When the front and back nuts are caused to approach to each other, the apexes move apart in opposite lateral directions.

The design of the linkages ensures that, during expansion, one apex moves outward to the left while the other moves outward to the right, creating a balanced force across the palate. This symmetry is crucial for the effective operation of the device 100, preventing uneven expansion and ensuring that the palate expands uniformly.

The left and right pads are configured to secure anchoring components (not shown) such as clasps (wire components that wrap around molars and premolars), bands (metal rings that fit around the molars), and eyelets (the eyelets would allow mini implants, such as tiny screws, to be passed through the eyelets and embedded directly into the bone of the palate, enabling a pure 'skeletal' expansion). Alternatively, the anchoring components can be any component that attaches to teeth, the roof of the mouth, or any other portion of the mouth such that palatal expansion occurs when the apexes of the left and right linkages move apart from each other. The anchoring components can be secured permanently or removably. These pads are attached to the apexes of the left and right linkages such that the anchoring components (not shown) move laterally along with the linkage as the linkages pivot when the front and back nuts are caused to approach each other. This design ensures that the force is distributed evenly across the teeth, reducing the risk of discomfort or damage.

In some embodiments, the pads can directly contact a patient's teeth during the palate expansion process. The pads can include a flat or slightly contoured surface that aligns with the shape of the patient's teeth or the palate. The size of the pads can be generally sufficient to cover the area of the teeth they are intended to press against, providing stable and consistent pressure during the expansion process.

In some embodiments, anchoring components (not shown) are attached directly to the apexes of the left and right linkages such that the that the anchoring components (not shown) move laterally along with the linkage as the linkages pivot when the front and back nuts are caused to approach each other.

In some embodiments, the pads sit within a housing 120 when in a non-expanded state. As the nuts move and the linkages push the pads outward, the pads protrude from the sides of the housing 120, making contact with the teeth.

In some embodiments, the anchoring components (not shown) it within a housing 120 when in a non-expanded state. As the nuts move and the linkages push the pads outward, the anchoring components (not shown) protrude from the sides of the housing 120.

Figure 2:
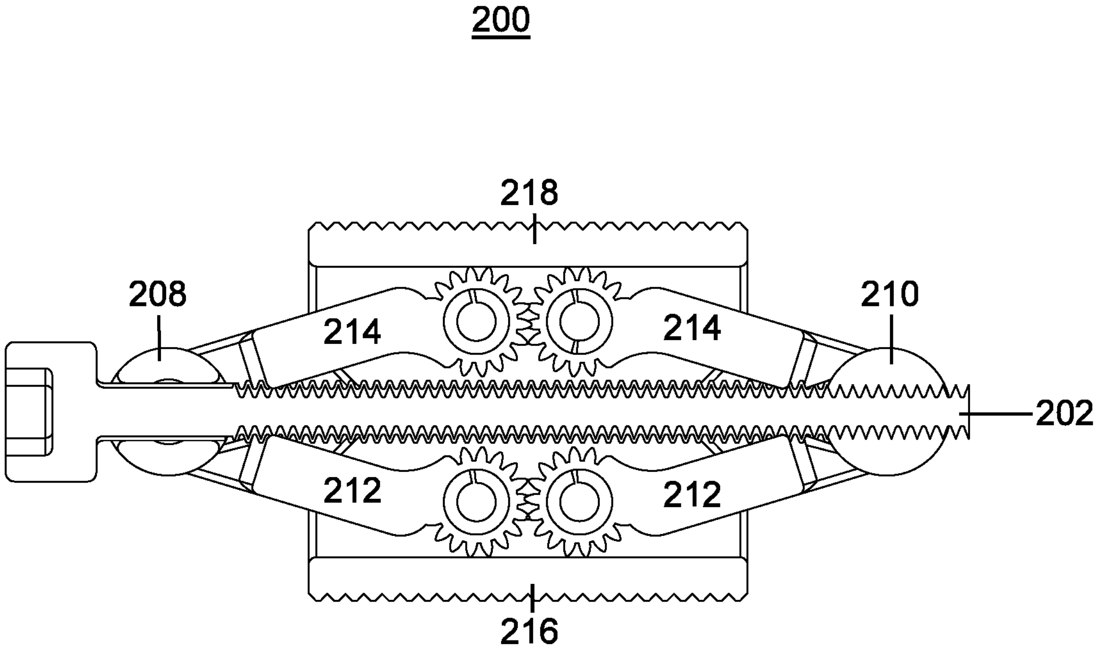
FIG. 2 is a cross-sectional view of internal components, according to an embodiment.

FIG. 2 is a cross-sectional view of internal components, according to an embodiment. Here, the first gear 104 is mounted at the front end of the screw 102, the front nut 108 is s configured to rotatably hold the front end of the screw 102, and the back nut 110 is threadably received on the back end of the screw 102. Rotating the screw 102 causes the back nut 110 to move towards the front nut 108, pushing the pads apart in opposite lateral directions.

Figure 3:
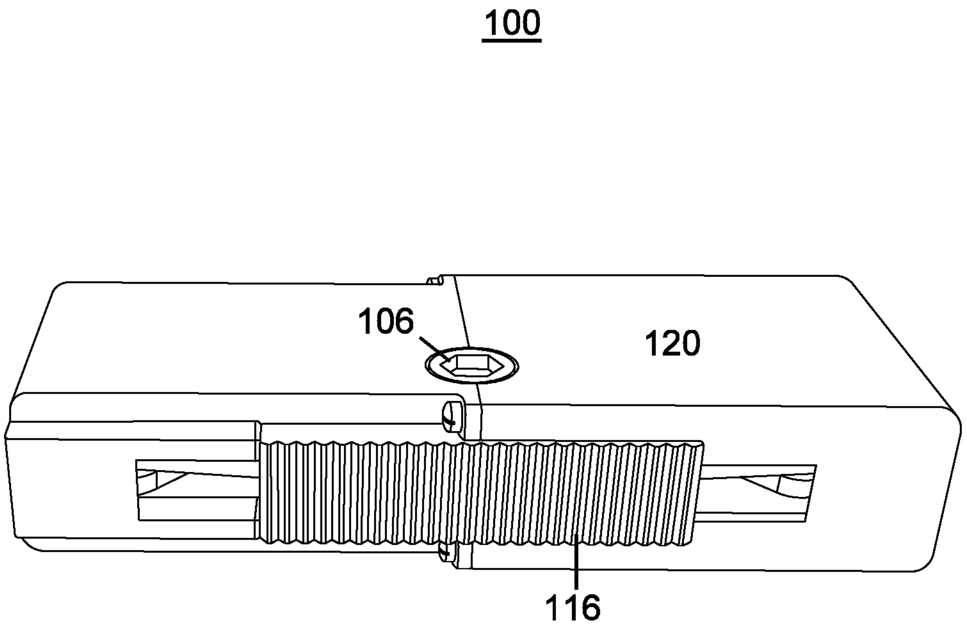
FIG. 3 shows a housing for a palate expanding device, according to an embodiment.

FIG. 3 shows a housing 120 for a palate expanding device 100, according to an embodiment. The housing 120 can serve as the structural casing that encloses and protects the internal components of the device 100, including the screw 102, nuts, linkages, and pads. By containing these parts, the housing 120 helps to prevent any foreign material from entering the mechanism, ensuring smooth operation and reducing the risk of malfunction.

The housing 120 can have a compact, streamlined shape that fits comfortably within the patient's oral cavity, often positioned along the roof of the mouth (palate). Its size and shape are tailored to minimize discomfort and ensure that it does not interfere with normal oral functions such as speaking or eating. The housing 120 may have rounded or contoured edges to further enhance comfort and reduce the risk of irritation to the surrounding tissues.

The screw 102, nuts, linkages, and pads can be movably held in pathways or channels of the housing 120 to ensure that the parts move in a controlled and precise manner, contributing to the effective expansion of the palate In a first, non-expanded configuration, the pads and linkages sit within the housing 120. In a second, expanded configuration, the pads protrude past the sides of the housing 120 as the front and back nuts are caused to approach each other.

The housing 120 may include an access point for the torque-producing tool to engage with the second gear 106. This access point is strategically placed to allow easy operation of the device 100 while maintaining the protective function of the housing 120.

In some cases, the housing 120 may be customized to fit the specific anatomy of the patient's palate, ensuring that it sits securely and comfortably within the mouth. This customization can be achieved through digital scanning and 3D printing techniques, providing a personalized fit that enhances the effectiveness of the treatment.

Figure 4:
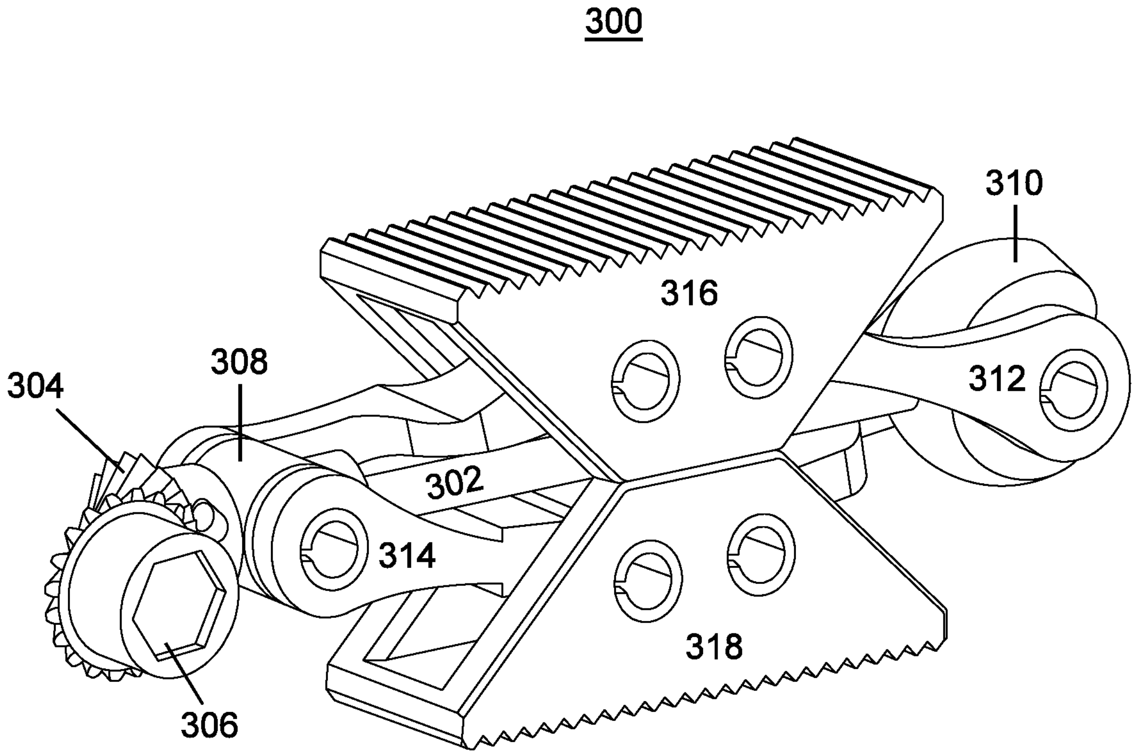
FIG. 4 shows a palate expanding having a front gear arrangement, according to an embodiment.

FIG. 4 shows a palate expanding device 100 having a front gear arrangement, according to an embodiment. Here, the first gear 104 is a 45 degree bevel gear mounted at the front end of the screw 102 and the second gear 106 is a 45 degree bevel gear coupled to the first gear 104, where the angle in between axes of rotation of the first and second gears is 90 degrees.

Figure 5A:
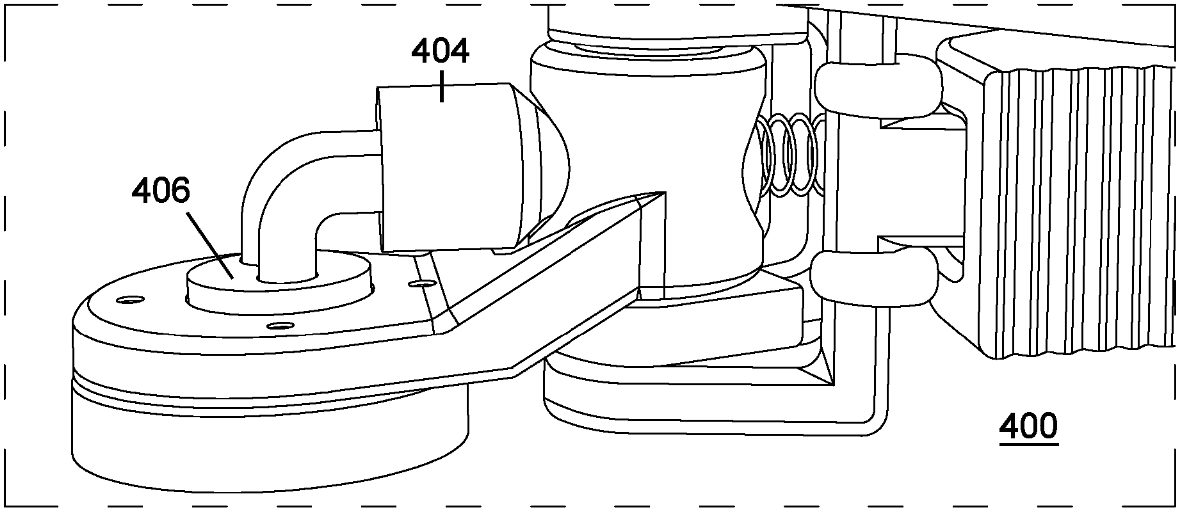
FIGS. 5*a*-5*c* show various gear arrangements, according to an embodiment.
Figure 5B:
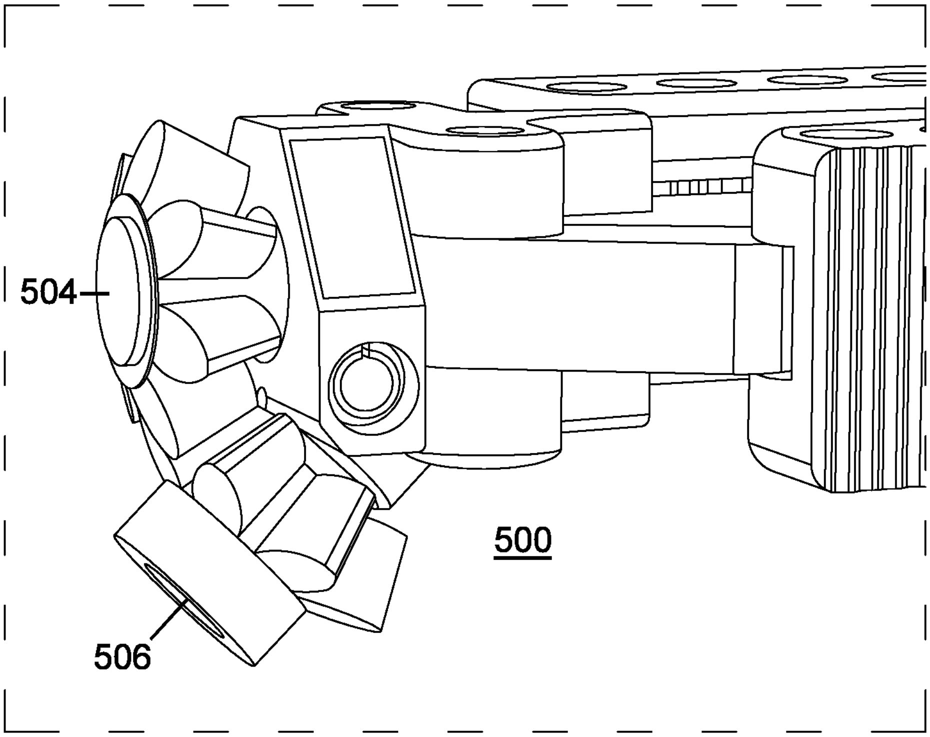
Figure 5C:
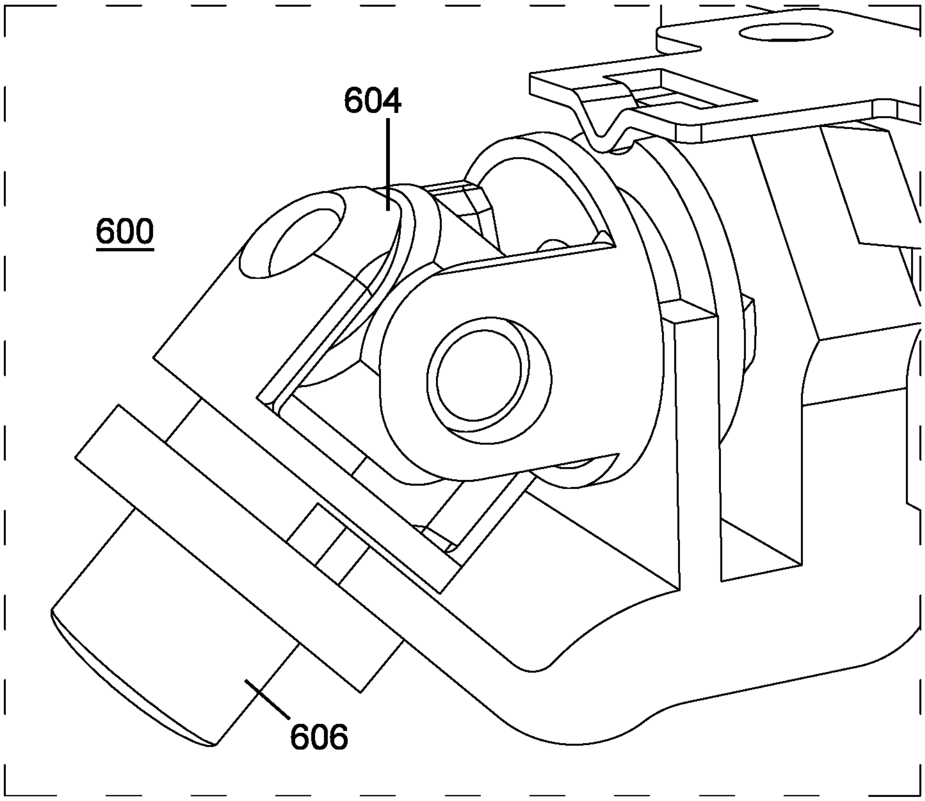

FIGS. 5*a*-5*c* show various gear arrangements, according to an embodiment.

FIG. 5*a* shows a palate expanding device 100 having a front gear arrangement where the first and second gears are a custom angular transmission, where the angle between the axes of rotation of the first and second gears is 90 degrees.

FIG. 5*a* shows a palate expanding device 100 having a front gear arrangement where the first gear 104 is a 22.5 degree bevel gear and the second gear 106 is a 22.5 degree bevel gear coupled to the first gear 104, where the angle in between the axes of rotation of the first and second gears is 45 degrees.

FIG. 5*c* shows a palate expanding device 100 having a front gear arrangement where the first and second gears are a universal joint, where the angle between the axes of rotation of the first and second gears is 45 degrees.

The palate of a patient wearing the device 100 can be expanded following these steps:

1) The patient opens his or her mouth.
2) A hex key is inserted into the patient's mouth.
3) An end of the hex key is received by the second gear 106.
4) The hex key is rotated until the device 100 is sufficiently expanded.
5) The end of the hex key is removed from the second gear 106.
6) The hex key is taken out of the patient's mouth.

Figure 6A:
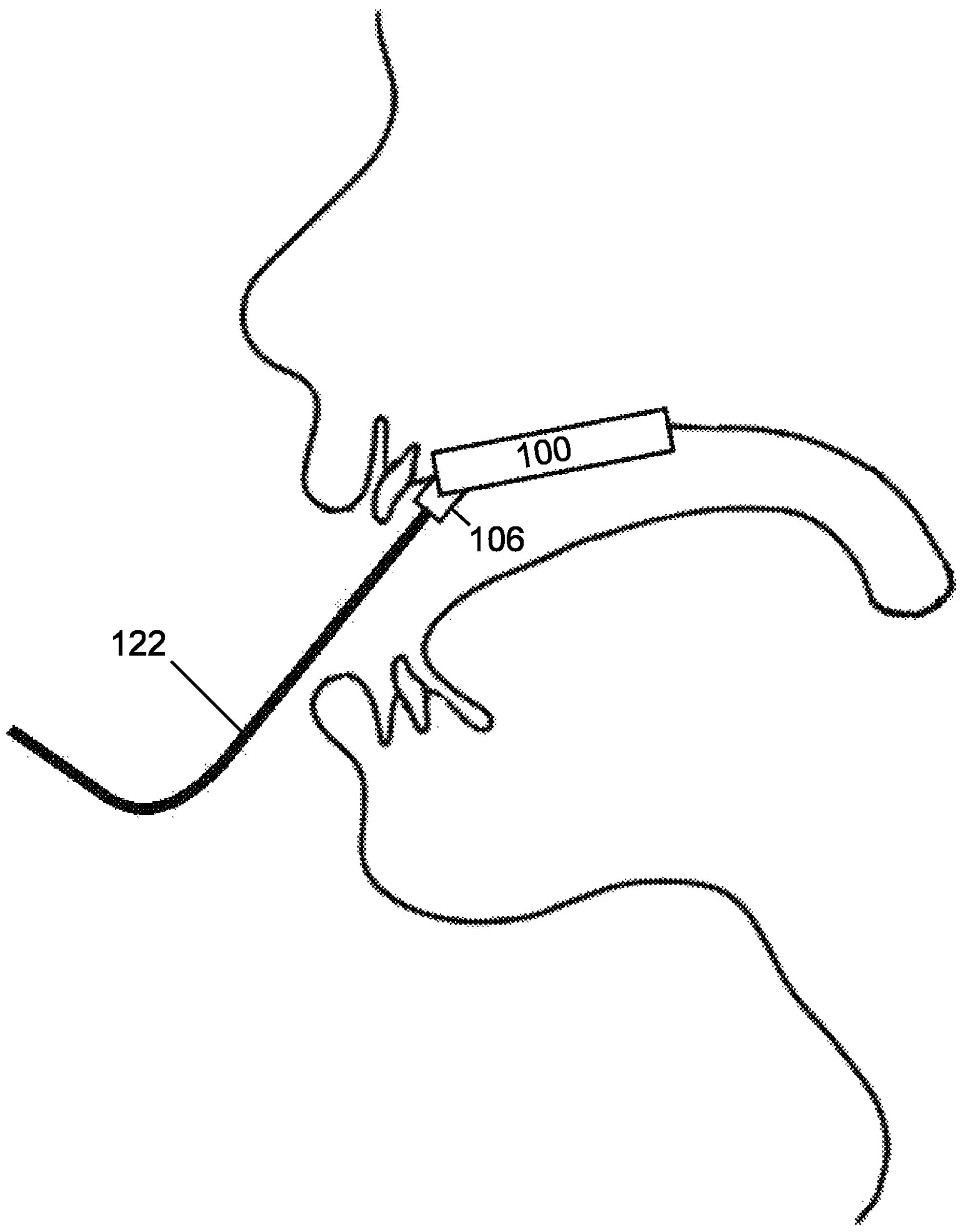
FIG. 6*a* is a cross-sectional view of a palate expanding device inside of a patient's mouth, the first screw having a forward placement, according to an embodiment.

FIG. 6*a* is a cross-sectional view of a palate expanding device 100 inside of a patient's mouth. For clarity purposes, only the second gear 106 is illustrated. The second gear 106 has a forward placement and the angle between an angle in between axes of rotation of the first and second gears is approximately 45 degrees. The hex key 122 received by the second gear 106 can be rotated continuously while the device 100 is being expanded.

Figure 6B:
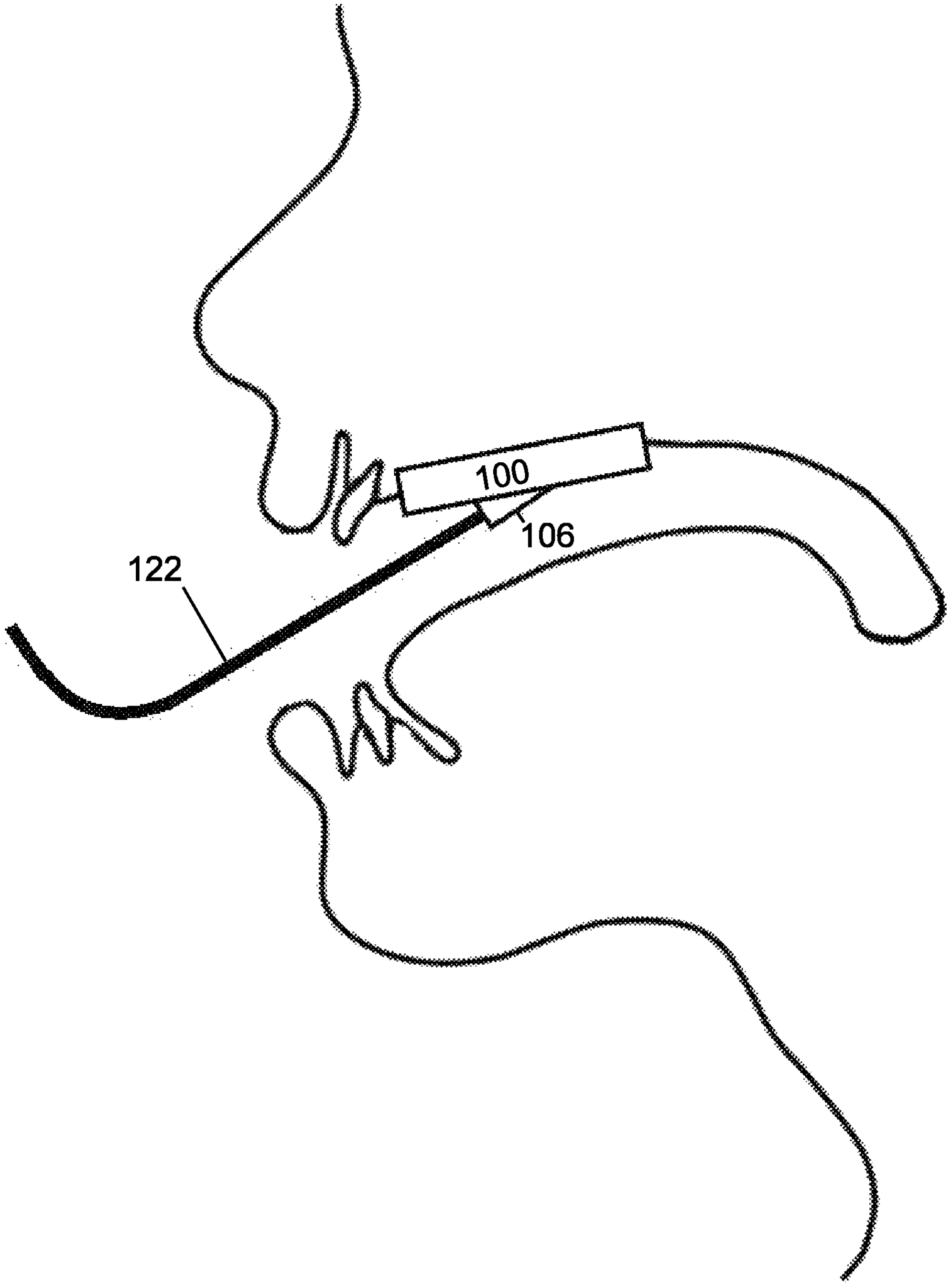
FIG. 6*b* is a cross-sectional view of a palate expanding device inside of a patient's mouth, the first screw having a central placement, according to an embodiment.

FIG. 6*b* is a cross-sectional view of a palate expanding device 100 inside of a patient's mouth. For clarity purposes, only the second gear 106 is illustrated. The second gear 106 has a central placement and the angle between an angle in between axes of rotation of the first and second gears is approximately 22.5 degrees. The hex key 122 received by the second gear 106 can be rotated continuously while the device 100 is being expanded.

In some embodiments, there are ruler markings or other demarcations on one or more parts of the device 100 such that the amount of palatal expansion can be effectively measured.

I claim:

1. A device for laterally expanding a palate of a patient, the device comprising:

a longitudinally extending screw having oppositely threaded wherein front and back ends,
 the front end of the screw is configured to be positioned behind upper front teeth;
 a first gear is mounted at the front end of the screw;
 a second gear coupled to the first gear, wherein
  a head of the second gear is configured to receive a torque producing tool;
  the screw is caused to rotate when the second gear is rotated with the torque producing tool;
a front nut threadably received on the front end of the screw and a back nut threadably received on the back end of the screw, wherein
 the front and back nuts move opposite longitudinal directions when the screw is caused to rotate;
left and right hand linkages pivotally connected to the front and back nuts;
 apexes of the left and right hand linkages move in opposite lateral directions when the front and back nuts are caused to approach each other;
pads coupled to the apexes of the left and right hand linkages respectively, wherein the pads are configured to secure anchoring components.

2. The device of claim 1, wherein
the first and second gears are bevel gears; and
an angle in between axes of rotation of the first and second gears is 90 degrees.

3. The device of claim 1, wherein
the first and second gears are bevel gears; and
an angle in between axes of rotation of the first and second gears is greater than 5 degrees and less than 85 degrees.

4. The device of claim 1, wherein
the first and second gears are bevel gears;
an angle in between axes of rotation of the first and second gears is greater than 15 degrees and less than 75 degrees.

5. The device of claim 1, wherein
the first and second gears are bevel gears;
an angle in between axes of rotation of the first and second gears is greater than 25 degrees and less than 65 degrees.

6. The device of claim 1, wherein
the first and second gears are bevel gears;
an angle in between axes of rotation of the first and second gears is greater than 35 degrees and less than 55 degrees.

7. The device of claim 1, further comprising:
a housing, wherein
 the screw, front and back nuts, linkages, and pads sit within the housing in a first configuration; and
 the pads protrude out of sides of the housing when the front and back nuts are caused to approach each other.

* * * * *